United States Patent

Hanson et al.

[11] Patent Number: 5,943,927
[45] Date of Patent: Aug. 31, 1999

[54] APPARATUS AND METHOD FOR COUNTERBORING A PIPE

[75] Inventors: Beverley F. Hanson, Sherwood Park, Canada; Oliver Trueman Dierlam, Houston, Tex.

[73] Assignee: CRC-Evans Pipeline International, Inc., Houston, Tex.

[21] Appl. No.: 08/963,140

[22] Filed: Nov. 3, 1997

[51] Int. Cl.⁶ ............................. B23B 1/00; B23B 5/16
[52] U.S. Cl. ............................. 82/1.11; 82/1.5; 82/113; 82/158
[58] Field of Search ............................. 82/1.11, 113, 1.2, 82/1.4, 1.5, 131, 158, 161; 408/82, 80, 1 R

[56] References Cited

U.S. PATENT DOCUMENTS

| | | | |
|---|---|---|---|
| 2,215,344 | 9/1940 | Albrecht | 145/127 |
| 2,481,335 | 9/1949 | Olsen et al. | 82/1.5 X |
| 2,711,664 | 6/1955 | Misuraca . | |
| 3,164,062 | 1/1965 | Hogden et al. | 82/113 X |
| 3,608,406 | 9/1971 | Paysinger et al. . | |
| 3,691,881 | 9/1972 | Bachmann . | |
| 3,699,828 | 10/1972 | Piatek et al. . | |
| 3,733,939 | 5/1973 | Paysinger et al. . | |
| 3,835,738 | 9/1974 | Kellum et al. . | |
| 4,126,065 | 11/1978 | Clavin . | |
| 4,532,837 | 8/1985 | Cushenbery et al. . | |
| 4,550,635 | 11/1985 | Kanayama et al. . | |
| 4,634,323 | 1/1987 | Wagner et al. | 409/167 |
| 4,682,919 | 7/1987 | Mitchell | 409/179 |
| 4,691,600 | 9/1987 | Carlson et al. | 408/80 X |
| 4,822,221 | 4/1989 | Illakowicz | 409/309 |
| 4,944,205 | 7/1990 | Ricci | 82/113 |
| 5,054,342 | 10/1991 | Swiatowy et al. | 82/113 |
| 5,171,110 | 12/1992 | Pettifer et al. | 408/1 R |
| 5,361,659 | 11/1994 | Hanson | 82/113 |

FOREIGN PATENT DOCUMENTS

| | | | |
|---|---|---|---|
| 402172602 | 7/1990 | Japan | 82/113 |
| 1194605 | 11/1985 | U.S.S.R. | 82/113 |

*Primary Examiner*—Andrea L. Pitts
*Assistant Examiner*—Henry W. H. Tsai
*Attorney, Agent, or Firm*—Sidley & Austin

[57] ABSTRACT

An apparatus (20) for counterboring a pipe (25) includes an expander unit (24), a shaft (26) extending from the expander unit, a flywheel (30) rotatably and slidably mounted on the shaft, a frame (34) mounted on the flywheel to be movable in a radial direction, a tool mount (50) and a guide wheel mount (52) formed on the frame, the tool mount traveling with the flywheel into the interior of the pipe during counterboring and the guide wheel mount traveling outside of the pipe during counterboring, the guide wheel mount being connected to the tool mount by guide wheel arm (51) having a radial member (54) that is axially offset to the rear of the tool mount by a distance at least the length of the counterbore to be machined in the pipe, a cutting tool (56) adjustably mounted to the tool mount, a guide wheel (72) rotatably mounted on the guide wheel mount, an inward force applying member (116) and an outward force applying member (122) connected between the flywheel and the frame such that the frame can be moved and biased with respect to the flywheel, the radially innermost point of the guide wheel being radially spaced apart from the cutting tool to define the wall thickness of the counterbore to be machined into the pipe.

10 Claims, 8 Drawing Sheets

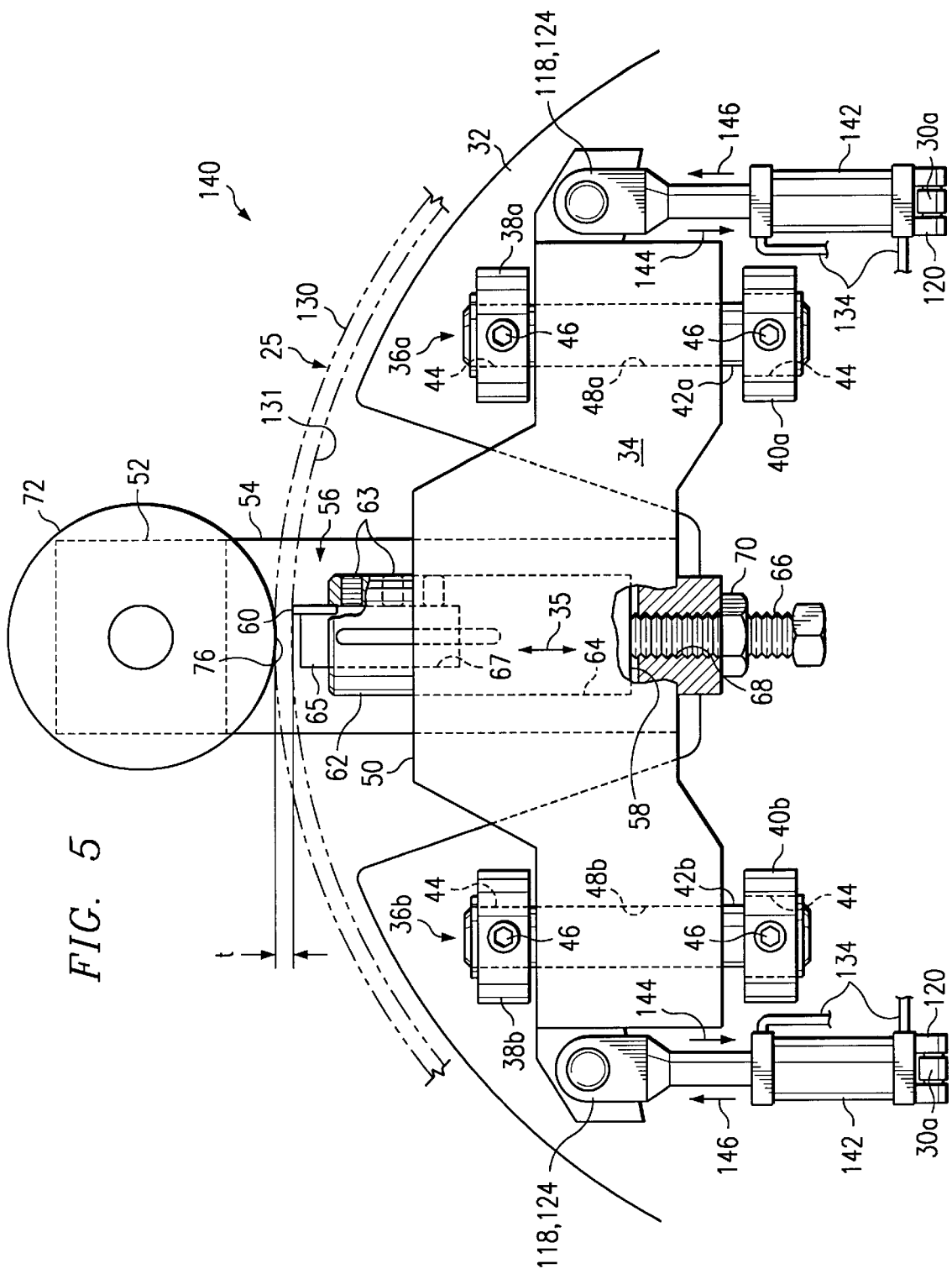

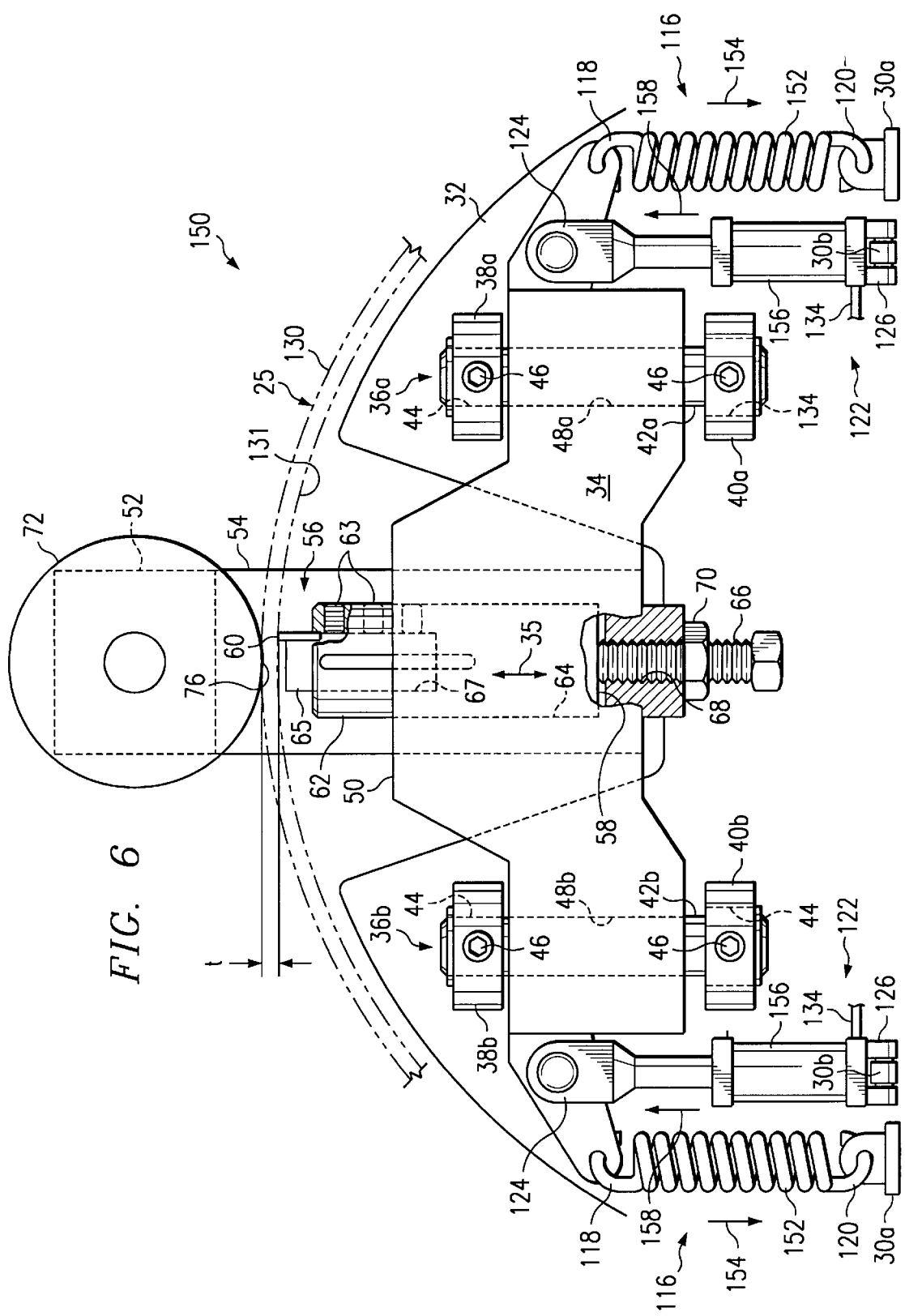

APPARATUS AND METHOD FOR COUNTERBORING A PIPE

TECHNICAL FIELD OF THE INVENTION

This invention generally relates to an apparatus and method for counterboring a pipe. In one aspect it relates to an apparatus for rotating and axially advancing a cutting tool against the inside surface of a pipe.

BACKGROUND OF THE INVENTION

In connecting two pipes together, it is often advantageous to counterbore one pipe end so that certain dimensions of the end, for example wall thickness and/or inside diameter, can be appropriately matched with the end of the other pipe to facilitate proper welding of the two pipe ends together. Precision and accuracy are desired when counterboring pipe ends. The machining device must be held firmly in relation to the pipe in order to achieve these results. Further, in many instances a pipe in the field is out of round due to rough handling or manufacturing limitations. This is especially common in pipes having large diameters or having relatively thin walls compared to the diameter, such as those used for oil and gas pipelines. It is therefore desirable that the machining tool follow the actual circumferential wall surface of the pipe with high precision to ensure uniform machining of the counterbore.

U.S. Pat. No. 5,171,110 to Pettifer et al. (the Pettifer '110 patent) and U.S. Pat. No. 5,361,659 to Hanson (the Hanson '659 patent) disclose two machining devices that rotate a cutting tool against the inside circumferential surface of the pipe end and advance it axially into the pipe until a counterbore has been formed. In the Pettifer '110 patent, the cutting tool is pivotally connected to a rotating flywheel and the cutting tool is pressed radially outward against the inside surface of the pipe by being rotated about its pivot point. In the Hanson '659 patent, the cutting tool is slidably mounted on a pair of spaced-apart parallel guide structures connected to a rotating flywheel and the cutting tool is pressed radially outward against the inside surface of the pipe by being slid radially along the guide structures.

In both the Pettifer '110 patent and the Hanson '659 patent, the radial depth of cut of the counterbore is controlled by a guide wheel which is connected to the cutting tool and pressed against the inside surface of the pipe at a location offset axially ahead of the position of the cutting tool. The guide wheel follows the inside contour of the pipe causing the cutting tool to oscillate radially so as to reproduce the inside contour of the pipe in the counterbore section.

It has been found that counterbore devices using a guide wheel which presses against the inside surface of the pipe can produce defects in the counterbore where the pipe interior has surface defects, for example weld seams, weld spatter, or pipe scale, or where the pipe interior is contaminated with dirt or other debris. Such surface defects or contaminating materials are not uncommon in the pipes used, for example, on cross-country oil and gas pipelines. The location of these defects or contaminants within the interior of the pipe makes their detection problematic, and even if detected, they can be hard to remove. A need therefore exists, for an apparatus for counterboring a pipe which does not control the radial depth of cut of the cutting tool by pressing a guide member against the inside surface of the pipe.

It has also been found that counterbore devices using a guide wheel which is offset axially (i.e., parallel to the longitudinal axis of the pipe) from the position of the cutting tool can produce defects in the counterbore where the circumferential profile of the pipe changes in the axial direction. For example, if only a few inches of the end portion of the pipe are out of round due to field handling, while the remaining portion of the pipe is in round, then an apparatus having a guide wheel which is offset axially from the cutting tool can produce a counterbore which does not accurately match the circumferential profile of the counterbored section of pipe. A need therefore exists, for a counterbore device which uses a guide wheel which is not offset axially from the location of the cutting tool.

For reasons of safety, expense, and convenience, ultrasonic inspection means are rapidly replacing radiographic (x-ray) inspection means for the testing of field welds made during the construction of pipelines. To facilitate such ultrasonic inspection, many pipes are now furnished with a precision ground outer surface at each end. These ground areas at the ends of the pipe typically have a very smooth finish, are free of surface defects or contamination, and are easily accessible for the removal of any defects or contamination which may be present. A need therefore exists, for a counterbore method and apparatus which utilizes the outer surface of a pipe end for controlling depth of cut of a counterbore.

SUMMARY OF THE INVENTION

The present invention provides a counterboring apparatus for machining a counterbore in a pipe. The apparatus comprises an expander unit which is adapted for being secured inside of the pipe against the inside surface of the pipe. A shaft extends axially from the expander unit and has a center axis coaxial with the longitudinal axis of the pipe when the expander is secured against the inside surface of the pipe. A flywheel is rotatably and slidably mounted on the shaft. The flywheel has a rotational axis coaxial with the center axis of the shaft and a front side axially facing the expander unit. The flywheel is slidable in an axial direction along the shaft over a distance at least equal to the length of the counterbore to be machined in the pipe. The flywheel is simultaneously slidable and rotatable on the shaft. A frame is mounted on the flywheel such that the frame is movable in a radial direction relative to the center axis of the flywheel. A cutting tool is adjustably mounted to the frame at a proximal end and has a distal end that is extendable radially beyond the radially outermost point of the frame. A guide wheel is rotatably mounted on an arm extending from the frame such that the guide wheel is radially outwardly spaced apart from the distal end of the cutting tool. At least one inward force applying member and at least one outward force applying member are provided attached between the frame and the flywheel to move and/or bias the frame with respect to the flywheel. During the counterbore operation, the inward force applying member is used to bring the guide wheel into contact with the outside surface of the pipe while the cutting tool is brought into contact with the inside surface of the pipe end. As the flywheel is rotated and advanced axially into the pipe end, the cutting tool forms the counterbore with the depth of cut being controlled by the radial distance between the cutting tool and the guide wheel.

In one embodiment of the current invention, the frame is movably attached to the flywheel by guide structures mounted on the flywheel and guide channels formed on the frame which interfit such that the frame is linearly slidable in a radial direction relative to the center axis of the flywheel. In another embodiment of the current invention, the frame is movably attached to the flywheel by a pivotal mount having an axis of rotation parallel to the longitudinal axis of the pipe. In yet another aspect of the current invention, the axial position of the guide wheel is axially aligned with the axial position of the cutting tool. In still another aspect of the current invention, the inward force applying member is a single-acting hydraulic cylinder and the outward force applying member is a compression spring. In yet another embodiment, the inward force applying member is a double-acting hydraulic cylinder being actuated in a first direction and the outward force applying member is the double-acting hydraulic cylinder being actuated in a second direction. In another embodiment, the inward force applying member is a tension spring and the outward force applying member is a single-acting hydraulic cylinder. In still another aspect, the apparatus further comprises a hydraulic accumulator mounted on the flywheel and operably connected to a hydraulic cylinder. In a still further aspect of the current invention, the guide wheel mount further comprises an eccentric shaft having a first shank defining a first shank axis and being rotatably mounted in a front portion of the guide wheel mount and a second shank defining a second shank axis upon which the guide wheel is rotatably mounted. The first and second shank axes are parallel to one another but spaced such that rotation of the shaft about the first shank axis will change the radial position of the guide wheel with respect to the frame. In yet another embodiment, a locking mechanism is provided for selectively fixing the relative positions of the first and second shank axes.

BRIEF DESCRIPTION OF THE DRAWINGS

A better and more complete understanding of the present invention and advantages thereof will be gained from the following detailed description, claims, and accompanying drawings in which:

FIG. 5 is a partial front view of a counterbore apparatus according to another embodiment of the current invention; and FIG. 6 is a partial front view of a counterbore apparatus according to yet another embodiment of the current invention.

DETAILED DESCRIPTION

Figure 1:
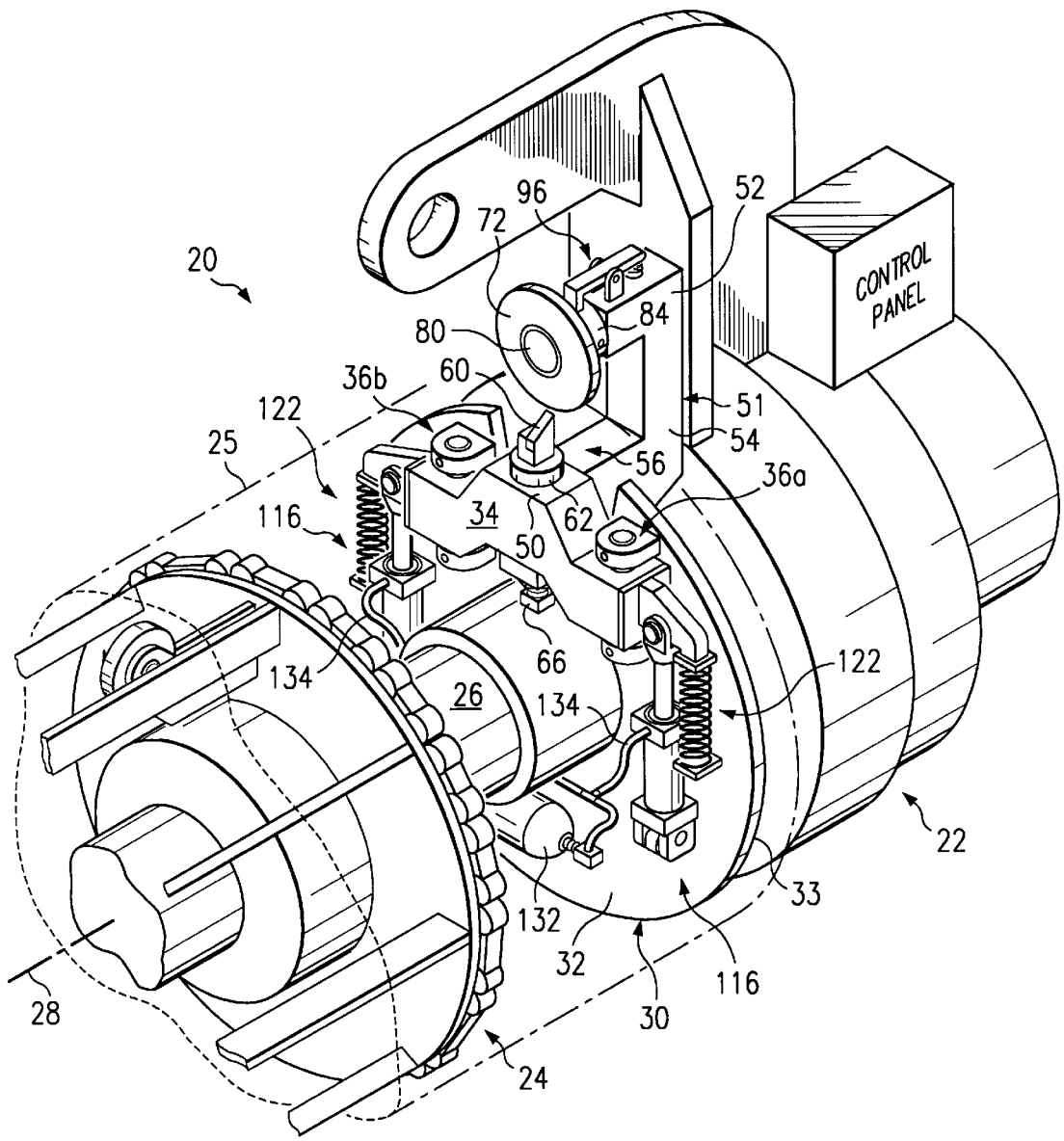
FIG. 1 is a perspective view of a counterbore apparatus according to a first embodiment of the current invention.

With reference to the accompanying FIGS. 1–6, wherein like reference numerals designate like or corresponding parts through the several views, several embodiments of the present invention are explained hereinafter.

FIG. 1 illustrates a perspective view of a counterbore apparatus 20 according to one embodiment of the current invention. Apparatus 20 has a housing 22 which contains the controls and drive motors needed for operation of the apparatus. Opposite from housing 22 is expander unit 24 which is sized and constructed for being inserted into a pipe 25 (shown in phantom) and secured against the inside surface of the pipe. Shaft 26 extends axially from expander unit 24 and extends into housing 22. Shaft 26 has a center axis 28 coaxial with the longitudinal axis of the pipe when the expander is secured against the inside surface of the pipe. Preferably, the housing 22, expander unit 24, and shaft 26 assembly are the same as disclosed and described in the U.S. Pat. Nos. 5,171,110 and/or 5,361,659. The disclosure and teachings of U.S. Pat. No. 5,171,110 to Pettifer et al. and of U.S. Pat. No. 5,361,659 to Hanson are both incorporated herein by reference.

Flywheel 30 is rotatably and slidably mounted on shaft 26. Flywheel 30 has a rotational axis coaxial with the center axis 28 of shaft 26. Flywheel 30 has a front side 32 axially facing expander unit 24 and a rear side 33 axially facing away from expander unit 24. Flywheel 30 is slidable in an axial direction along the shaft 26 over a distance of at least the length of the counterbore to be machined in the pipe. Flywheel 30 is simultaneously slidable and rotatable on shaft 26.

Figure 2:
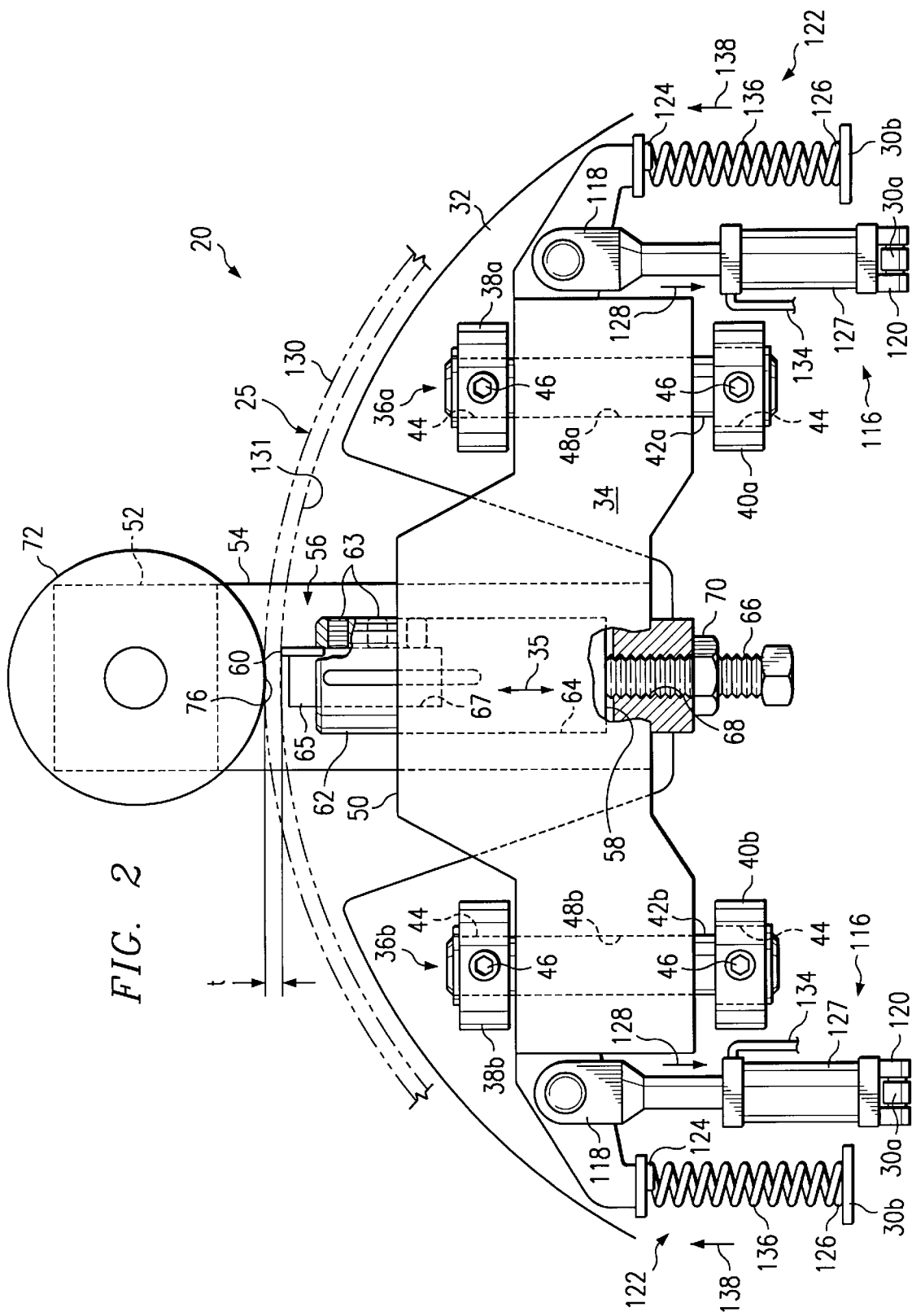
FIG. 2 is a partial front view of the counterbore apparatus of FIG. 1 with a portion broken away to show the adjustment mechanism.

With additional reference to FIG. 2, further structure of the present invention can be more clearly seen. A frame 34 is movably attached to front side 32 of flywheel 30 such that frame 34 rotates with flywheel 30 around shaft 26 but frame 34 can move in a radial direction (denoted by arrow 35) relative to the center axis 28 of flywheel 30. In the embodiment shown in FIG. 2, frame 34 is movably attached to flywheel 30 by a pair of guide structures 36a,b mounted on flywheel 30 parallel to each other and each having a first end 38a,b and a second end 40a,b connected to flywheel 30 and a guide rod section 42a,b extending from the first end 38a,b to the second end 40a,b in a plane parallel to the front side 32 of flywheel 30. Each guide structure 36a,b is located substantially the same distance from center axis 28 of flywheel 30. In the preferred embodiment, first ends 38a,b and second ends 40a,b are lugs extending perpendicularly from front side 32 that have holes 44 therein. Holes 44 in first ends 38a,b are aligned with holes 44 and second ends 40a,b. Guide rod sections 42a,b are cylindrical rods which are disposed through holes 44 and have an outer diameter slightly smaller than the inner diameter of the holes 44. Guide rod sections 42a,b are retained in holes 44 by set screws 46 which screw through first ends 38a,b and second ends 40a,b to contact the outer surface of guide rod sections 42a,b and lock guide rod sections 42a,b in place inside holes 44. Guide rod sections 42a,b are parallel to each other.

Frame 34 is slidably disposed on guide rod sections 42a,b. Frame 34 defines a pair of guide channels 48a,b through which guide rod sections 42a,b are disposed. After assembly of guide channels 48a,b onto guide rod structures 42a,b, frame 34 is linearly slidable along guide rod sections 42a,b in a radial direction relative to the center axis 28 of flywheel 30.

While frame 34 is slidably mounted to flywheel 30 in the embodiment shown in FIGS. 1 and 2, it will be readily apparent that the scope of the current invention encompasses alternative configurations for mounting frame 34 to flywheel 30 such that frame 34 is simultaneously circumferentially affixed (that is, it rotates around axis 28 with flywheel 30) and radially movably attached to flywheel 30. For example, rather than using guide structures 36a,b, frame 34 can be attached to flywheel 30 by a single pivotal mount (not shown) having an axis of rotation parallel to the longitudinal axis 28 of the pipe such as is disclosed in the Pettifer '110 patent.

Figure 3:
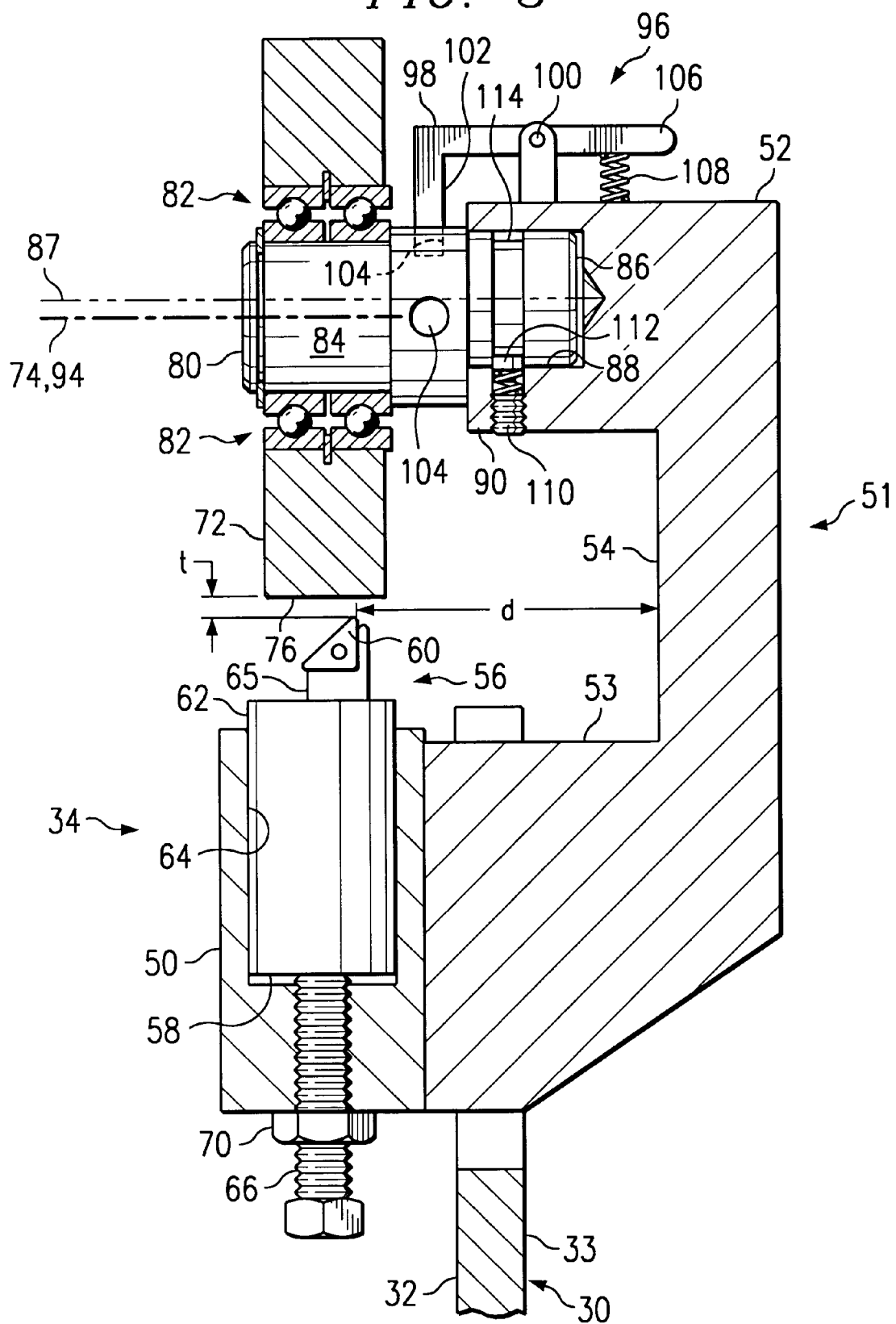
FIG. 3 is a sectional side view of the counterbore apparatus.

Referring now also to FIG. 3, frame 34 includes a portion defining a tool mount 50 adapted to adjustably hold a cutting tool 56. In the embodiment shown, tool mount 50 defines a bore 64 for receiving a cutting tool 56, however, other configurations of tool mount 50 can be used. Tool mount 50 is radially disposed on frame 34 such that tool mount 50 travels with flywheel 30 into the interior of the pipe during counterboring.

A guide wheel arm 51 is rigidly connected between frame 34 and a guide wheel mount 52 which is disposed at a radial distance from longitudinal axis 28 (FIG. 1) such that guide wheel mount 52 remains radially outside of the pipe during counterboring. As can best be seen in FIG. 3, guide wheel arm 51 includes an axial member 53 and a radial member 54. Axial member 53 extends axially rearward from tool mount 50 before joining radial member 54 such that radial member 54 is axially offset to the rear of cutting tool 56 by a distance (denoted by reference letter d in FIG. 3) at least the length of the counterbore to be machined in the pipe. Radial member 54 extends radially outward with respect to longitudinal axis 28 to support guide wheel mount 52 in a radial position that is outside the pipe to be counterbored. In terms of construction, guide wheel arm 51 can be formed integrally with frame 34 or it can be formed separately and then rigidly attached to frame 34, for example, by welding or bolting, such that arm 51 and frame 34 move as a single unit. Similarly, guide wheel mount 52 can be formed integrally with guide wheel arm 51 or it can be formed separately and then rigidly attached to arm 51, such that mount 52 and arm 51 move as a single unit together with frame 34.

Cutting tool 56 has a radially proximal end 58 adjustably mounted to tool mount 50 of frame 34 and a radially distal end 60 that is extendable radially beyond the radially outermost point of tool mount 50. During the counterboring operation, distal end 60 will be forced against the inside surface of the pipe to form the counterbore. Distal end 60 is typically formed of a wear-resistant material, for example tungsten carbide, however, it will eventually wear out. To allow for replacement of the distal end 60, in the embodiment shown in FIGS. 2 and 3, cutting tool 56 comprises a replaceable blade 65 and a tool post 62. Blade 65 (incorporating distal end 60) is mounted in a passage 67 (FIG. 2) formed in tool post 62 and held therein by allen screws 63 (FIG. 2). Tool post 62 is located in bore 64 of tool mount 50. The radial position of cutting tool 56 is adjustable within bore 64 by set screw 66 which is threaded into a hole 68 formed in tool mount 50. Rotating set screw 66 adjusts the position of tool post 62 (and hence also the distal end 60 of cutting tool 56) in the radial direction as indicated by arrow 35 (FIG. 2). Locking nut 70 allows set screw 66 to be fixed from movement once tool post 62 is at the desired radial extent. A clamping bolt (not shown) can be rotated to exert a clamping force on tool post 62, thereby maintaining the radial adjustment of tool post 62, and hence also the radial adjustment of distal end 60 of cutting tool 56, with respect to tool mount 50 of frame 34.

Referring still to FIGS. 2 and 3, located radially further outward (with respect to axis of rotation 28 of flywheel 30) than cutting tool 56 is guide wheel 72. Guide wheel 72 is rotatably mounted on guide wheel mount 52, guide wheel 72 having an axis of rotation 74 (FIG. 3) that is parallel to the axis of rotation 28 of flywheel 30. During the counterbore operation, the radial positions of both guide wheel 72 and cutting tool 56 are fixed with respect to frame 34, therefore any movement of guide wheel 72 in the radial direction (with respect to axis of rotation 28 of flywheel 30) will cause cutting tool 56 to move radially the same distance. That is, cutting tool 56 will precisely duplicate the radial movements of guide wheel 72. The radially innermost point 76 (with respect to axis of rotation 28) of guidewheel 72 is radially outwardly spaced apart (again with respect to axis of rotation 28) from the distal end 60 of cutting tool 56 to define the desired wall thickness (denoted by reference letter t in FIG. 3) of the pipe end after counterboring.

During the counterboring operation, the guide wheel 72 remains radially outside of the pipe 25 being counterbored, and is held against the outside surface of the pipe by force applying members as described in greater detail below. Since guide wheel 72 travels on the outside surface of the pipe, the counterbore apparatus of the current invention takes advantage of any precision ground outer surfaces of the pipe to produce a counterbore with a very accurate wall thickness. Even if the pipe does not have precision ground ends, the outside surface of the pipe is easier to inspect and clean than the interior surface. Thus the counterbore apparatus of the current invention can be used to produce more accurate counterbores than produced by prior art devices having a guide wheel that presses on the inside surface of the pipe.

As best seen in FIG. 3, in the current embodiment the axial position of guide wheel 72 is axially aligned with the axial position of cutting tool 56. The axial alignment of the guide wheel 72 and cutting tool 56 ensures that any axially localized contours of the pipe 25 will be reproduced in the counterbore so that the wall thickness of the pipe is cut to the preselected thickness. Such axial alignment of cutting tool 56 and guide wheel 72 was not possible in prior art counterbore machines having a guide wheel that pressed against the inside surface of the pipe. Note, however, while the axial alignment of guide wheel 72 and cutting tool 56 is preferred, it will be readily appreciated that such alignment is not required.

The guide wheel 72 must be attached to the guide wheel mount 52 so that no relative radial movement occurs between the two during the counterbore operation. As best seen in FIG. 3, in the current embodiment, guide wheel 72 is attached to guide wheel mount 52 through bearings 82 and shank 80. While shank 80 may be rigidly mounted to guide wheel mount 52, in the embodiment shown in FIGS. 2 and 3, shank 80 is part of a movable eccentric shaft 84 that allows the radial position of guide wheel 72 to be adjusted relative to cutting tool 56. Eccentric shaft 84 has a first cylindrical shank 86 defining a first shank axis 87 and being rotatably mounted in a bore 88 formed in a front portion 90 of the guide wheel mount 52. The shank 80 defines a second shank axis 94 upon which guide wheel 72 is rotatably mounted. First and second shank axes 87, 94 are parallel to one another but spaced apart such that the rotation of the eccentric shaft 84 about the first shank axis 87 will change the radial position of the guide wheel 72 with respect to the frame 34 and hence with respect to cutting tool 56. In the embodiment shown in FIG. 3, first shank 86 is held axially in place by set screw 110 and spring follower 112 which engage groove 114 formed in shank 86.

When eccentric shaft 84 is used to mount guide wheel 72 onto guide wheel mount 52, a locking mechanism 96 is mounted on guide wheel mount 52. Locking mechanism 96 selectively fixes the relative positions of the first and second shank axes 87, 94. In the preferred embodiment shown in FIG. 3, locking mechanism 96 comprises a latch member 98 pivotally connected at pivot point 100 to the front portion 90 of guide wheel mount 52. Latch member 98 has a pin portion 102 which extends from the pivot point 100 to selectively engage one of a plurality of holes 104 formed around the periphery of eccentric shaft 84. Spring 108 acting through handle portion 106 of latch member 98 provides a bias urging pin portion 102 into engagement with holes 104 for locking the position of eccentric shaft 84. To change the position of shaft 84 with locking mechanism 96, the operator will insert a suitable tool (not shown) into one of holes 104 that is not otherwise engaged and manipulate handle portion 106 to overcome the bias of spring 108 such that pin portion 102 is disengaged from hole 104. Shaft 84 can then be rotated to a new position using the tool. Once in the desired position, pin portion 102 will be allowed to move into engagement with another of holes 104.

While the preferred embodiment shown in FIG. 3 utilizes a locking mechanism 96, it will be readily apparent that other configurations of the locking mechanism are within the scope of the current invention. For example, an alternative locking mechanism (not shown) comprises an adjustable set screw extending through guide wheel mount 52 into bore 88 in a direction generally perpendicular to first shank axis 87 and engaging first shank 86 of eccentric shaft 84. By loosening the set screw, the relative positions of shank axes 87, 94 can be adjusted, and by tightening the set screw, the relative positions are maintained by frictional contact between the set screw and shank 86.

Referring again to FIGS. 1 and 2, the current invention also includes an inward force applying member 116 having a first end 118 connected to frame 34 and a second end 120 connected to a portion of flywheel 30 (denoted by reference numerals 30a) such that frame 34 can be radially inwardly moved and/or biased with respect to flywheel 30. The invention further comprises an outward force applying member 122 having a first end 124 connected to frame 34 and a second end 126 connected to another portion of flywheel 30 (denoted by reference numerals 30b) such that frame 34 can be radially outwardly moved and/or biased with respect to flywheel 30.

In the embodiment shown in FIGS. 1 and 2, inward force applying member 116 is a single-acting hydraulic cylinder 127 applying force in the direction shown by arrow 128 when actuated, causing frame 34 to move radially inward with respect to flywheel 30. Since guide wheel 72 is connected to frame 34 by guide wheel mount 52 and guide wheel arm 51, the inward force (shown by arrow 128) provided by inward force applying member 116 can provide an inwardly directed bias urging guide wheel 72 to remain in contact with outer surface 130 of pipe 25. In the current embodiment, a pair of hydraulic cylinders 127 are provided, oriented parallel to each other so they provide uniform application of force against frame 34. Hydraulic cylinders 127 can be hydraulically powered by fluid from a hydraulic accumulator 132 (FIG. 1) mounted on flywheel 30 and operably connected to hydraulic cylinders 127 with hydraulic lines 134.

In the embodiment shown in FIGS. 1 and 2, outward force applying member 122 comprises a compression spring 136 which provides an outward directed force (denoted by arrow 138) urging frame 34 to move radially outwardly with respect to flywheel 30. In the current embodiment, a pair of compression springs 136 are provided to provide a uniform application of outward force against frame 34.

While the embodiment shown in FIGS. 1 and 2 uses a pair of single-acting hydraulic cylinders 127 for inward force applying member 116 and a pair of compression springs 136 for outward force applying member 122, it will be readily apparent that other configurations for inward and outward force applying members 116, 122 can be used without departing from the scope of the current invention. For example, referring now to FIG. 5, a counterbore apparatus 140 according to another embodiment of the current invention is shown. Counterbore apparatus 140 is substantially identical to counterbore device 20 previously described, except the inward force applying member is a double-acting hydraulic cylinder 142 being actuated in a first direction (shown by arrow 144) and the outward force applying member is the same double-acting hydraulic cylinder 142 being actuated in a second direction (shown by arrow 146). Although a single double-acting hydraulic cylinder 142 could be used for inward and outward force applying members, in the embodiment of counterbore apparatus 140 shown in FIG. 5, two double-acting hydraulic cylinders 142 are provided. The hydraulic cylinders can be powered by a hydraulic accumulator 132 (FIG. 1) mounted on flywheel 30 and operatively connected to cylinders 142 using hydraulic lines 134. Hydraulic valves (not shown) can be used to select the direction of operation as is well known. Also, while double-acting hydraulic cylinders 142 shown in FIG. 5 are oriented parallel to one another, it will be readily apparent that other configurations using double-acting hydraulic cylinders to provide the inward and outward force applying members are possible without departing from the scope of the current invention.

Referring now to FIG. 6, a counterbore apparatus 150 is provided according to yet another embodiment of the current invention. Counterbore apparatus 150 is similar to apparatus 20 previously described, except inward force applying member 116 comprises a tension spring 152 applying force in an inward direction, shown by arrow 154, and outward force applying member 122 is a single-acting hydraulic cylinder 156 applying force in an outward direction, shown by arrow 158, when actuated. In the embodiment of the apparatus shown in FIG. 6, inward force applying member 116 comprises a pair of tension springs 152 and outward force applying member 122 comprises a pair of single-acting hydraulic cylinders 156. In a preferred embodiment, tension springs 152 have a free coil length which is long in comparison to the maximum deflection when frame 34 is moved, such that coil spring 152 produces a spring force proportional to the deflection. Hydraulic cylinders 156 are preferably oriented parallel to one another such that they provide an even application of force against frame 34. Hydraulic cylinders 156 can be powered by a hydraulic accumulator 132 (FIG. 1) mounted on flywheel 30 and operably connected to hydraulic cylinders 156 through hydraulic lines 134.

While the counterbore apparatus shown in FIGS. 1, 2, 5, and 6 have all utilized pairs of hydraulic actuators or springs for the inward and outward force applying members 116, 122, it will be readily apparent that other configurations are possible without departing from the scope of the current invention. For example, if frame 34 is connected to flywheel 30 using a single pivotal mount having an axis of rotation parallel to the axis of rotation 28 of flywheel 30, then inward force applying member 116 can consist of one single-acting hydraulic cylinder and outward force applying member 122 can consist of one compression spring.

Figure 4A:
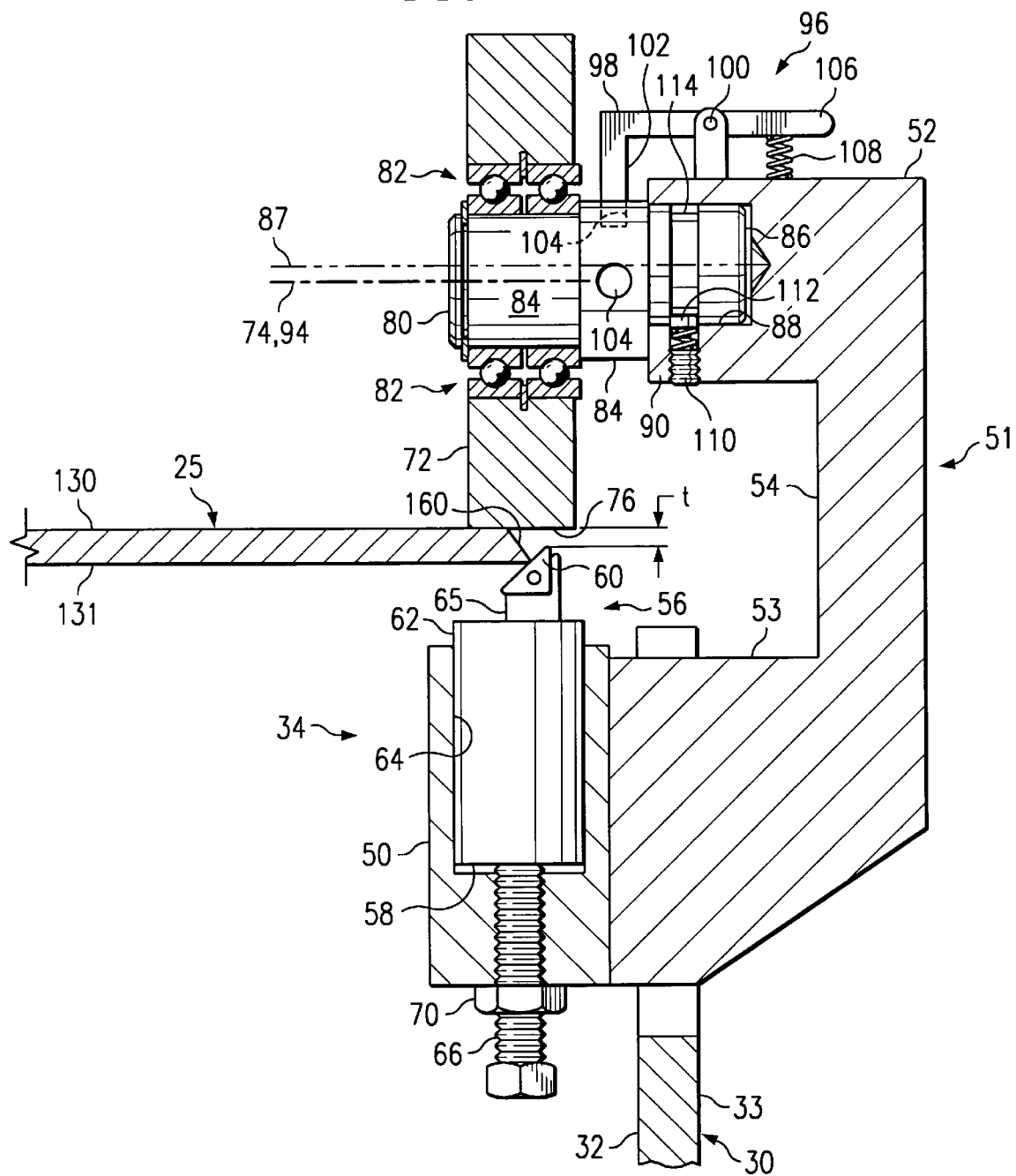
FIG. 4A is a sectional side view, similar to FIG. 3, of the counterbore apparatus and a portion of a pipe end, showing the counterbore apparatus configured prior to the machining of the counterbore.
Figure 4B:
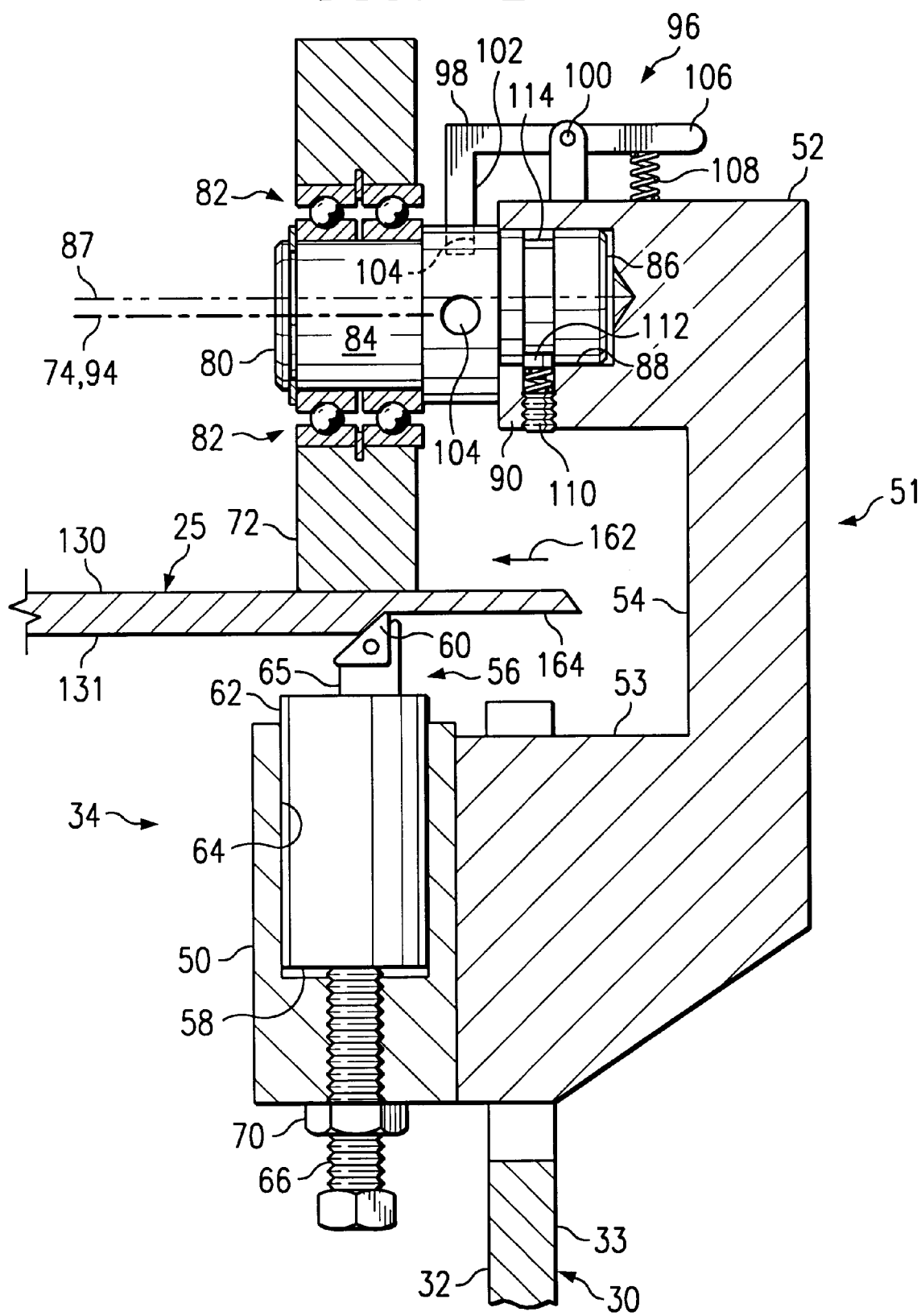
FIG. 4B is another view, similar to FIG. 4A, showing the counterbore apparatus and the pipe end during the counterboring operation.
Figure 4C:
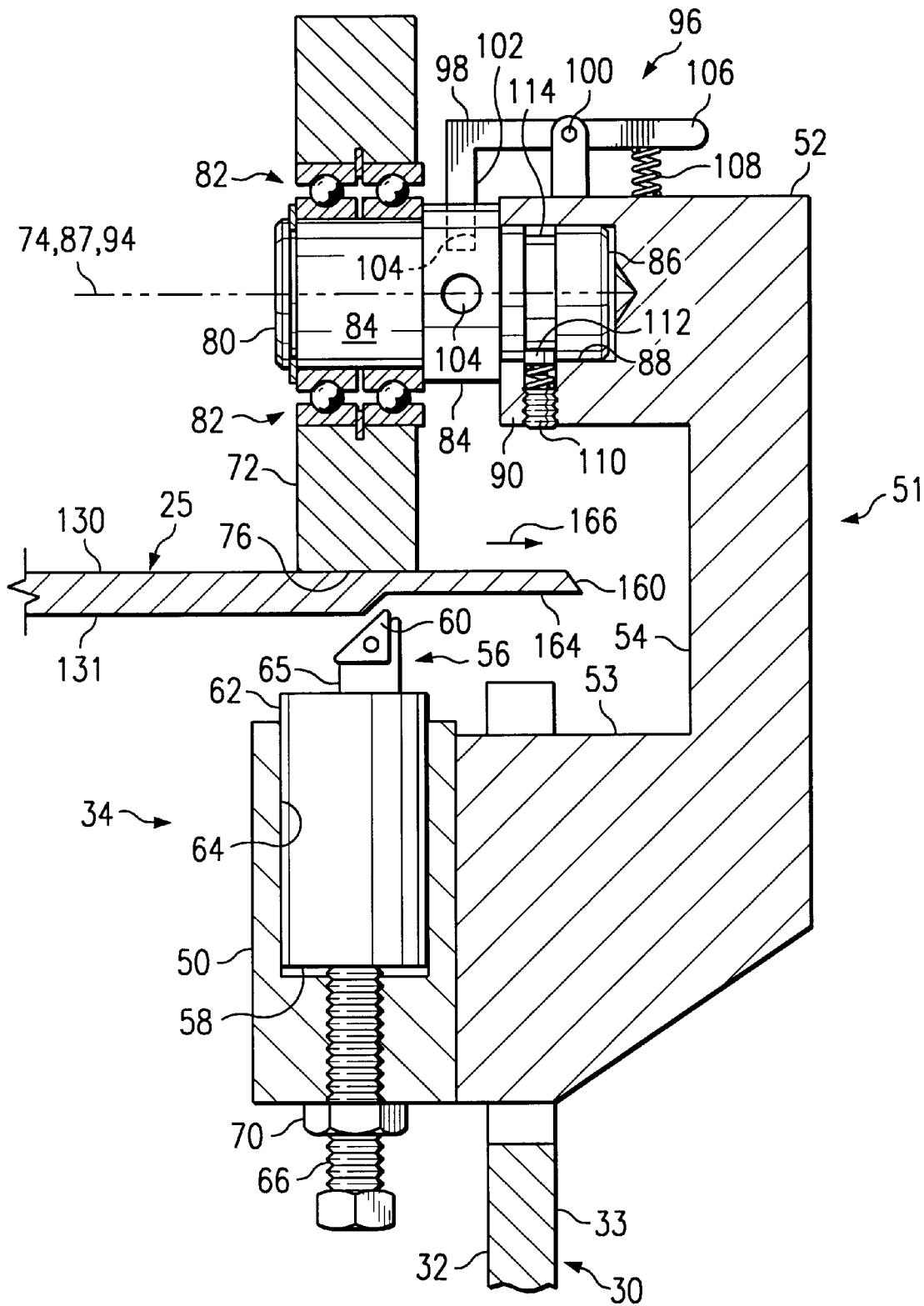
FIG. 4C is another view, similar to FIG. 4A, showing the counterbore apparatus and the pipe end with the apparatus configured for withdrawal of the cutting tool from the pipe end.

Operation of the counterbore device of the current invention is shown in FIGS. 4A–C. The desired radial wall thickness for the counterbore is set by adjusting the radial distance, t, between the radially innermost point 76 of guidewheel 72 and radially outermost point 60 of cutting tool 56. Expander unit 24 (FIG. 1) is then inserted into pipe 25 so as to engage the inside surface 131 of the pipe. Outward force applying member 122 (FIGS. 1, 2, 5, 6) is used to move the frame 34 radially outward with respect to flywheel 30 until the guide wheel 72 clears the outside surface of the pipe, that is, until the radial distance from longitudinal axis 28 to the radially innermost point 76 (with respect to axis 28) of guide wheel 72 is greater than the radial distance from longitudinal axis 28 to the outer surface 130 of the pipe 25. Next, flywheel 30 is advanced axially toward the end of pipe 25 until cutting tool 56 is adjacent to the axial end face 160 of pipe 25 and a portion of guide wheel 72 is axially aligned with the outside surface 130 of the pipe. Then, using inward force applying member 116 (FIGS. 1, 2, 5, 6), frame 34 is moved radially inward with respect to flywheel 30 until guide wheel 72 contacts outer surface 130 of pipe 25. Inward force applying member 116 thereafter maintains a radially inwardly directed bias on frame 34 with respect to flywheel 30 to hold guide wheel 72 firmly against the outer surface 130 of pipe 25. This inward bias is needed to overcome the effects of centrifugal forces when flywheel 30 is rotated and to keep cutting tool 56 from digging into the inner wall of the pipe during machining. At this stage of the counterboring operation, the apparatus will be in the configuration shown in FIG. 4A.

Referring now to FIG. 4B, flywheel 30 is next simultaneously rotated around axis 28 (FIG. 1) and axially advanced along shaft 26 in the direction indicated by arrow 162 to force cutting tool 56 against the end of pipe 25 such that cutting tool 56 travels into the interior of pipe 25 and machines a counterbore 164 having wall thickness t on the inner surface 131 of the pipe. The flywheel 30 continues to advance in the direction shown by arrow 162 until it reaches a predetermined distance equal to the desired depth of the counterbore. Once the counterbore has been machined to the predetermined depth, rotation of flywheel 30 is typically stopped and then the counterbore apparatus is removed from the pipe.

After machining of the counterbore is completed, it is desirable to remove the counterbore apparatus from the pipe without drawing the cutting tool 56 across the freshly counterbored section 164 of pipe 25. Referring now to FIG. 4C, when the guide wheel 72 is mounted on an eccentric shaft 84, the counterbore apparatus can be removed from the pipe without having the cutting tool 56 touch the newly counterbored section 164. After the counterbore has been machined to the desired depth, rotation of flywheel 30 is stopped. Locking mechanism 96 is then operated to unlock eccentric shaft 84 such that it can be rotated. For example, in the embodiment shown in FIG. 4C, latch member 98 would be manipulated by pressing handle portion 106 against the bias of spring 108 until pin portion 102 is disengaged from hole 104 in shaft 84. Shaft 84 is then rotated to change the radial position of guide wheel 72 with respect to frame 34 to increase the radial distance between the radially innermost point 76 on guide wheel 72 and radially outermost point 60 on cutting tool 56, thereby allowing cutting tool 56 to be drawn radially inward and out of contact with inner surface 164 of the counterbore under the influence of the inward bias being maintained by inward force applying member 116. Put another way, if no force was being applied to frame 34, then rotation of eccentric 84 would cause guide wheel 72 to move radially outward and out of contact with outer surface 130 of pipe 25. However, because inward force applying member 116 is maintaining a bias between flywheel 30 and frame 34, guide wheel 72 will remain in contact with outer surface 130 of the pipe and cutting tool 56 will instead be drawn radially inward such that uppermost point 60 will come out of contact with the inner surface 164 of the counterbore. This is the configuration shown in FIG. 4C. Flywheel 30 is then withdrawn along shaft 26 (FIG. 1) in the direction indicated by arrow 166 until cutting tool 56 is outside pipe 25 adjacent axial end face 160 and a portion of guide wheel 72 is still in contact with outer surface 130 of pipe 25. The outward force applying member 122 (FIGS. 1, 2, 5, 6) is then used to move frame 34 radially outward with respect to flywheel 30 until guide wheel 72 moves out of contact with outer surface 130 of pipe 25. Expander unit 24 (FIG. 1) can then be disengaged from the inner surface 131 of the pipe and the apparatus removed from the pipe.

Although embodiments of the present invention have been illustrated in the accompanying drawings and described in the foregoing detailed description, it will be understood that the invention is not limited to the embodiments disclosed but is capable of numerous rearrangements, modifications and substitutions without departing from the scope of the invention as set forth in appended claims.

We claim:

1. An apparatus for machining a counterbore in a pipe, the pipe having an inside surface, a longitudinal axis, an end face with a radial thickness, and an outside surface, the apparatus comprising:

(a) an expander unit adapted for being secured against the inside surface of the pipe;

(b) a shaft extending from the expander unit that has a center axis coaxial with the longitudinal axis of the pipe when the expander unit is secured against the inside surface of the pipe;

(c) a flywheel rotatably and slidably mounted on the shaft, the flywheel having a rotational axis coaxial with the center axis of the shaft, a front side axially facing the expander unit, and a rear side axially facing away from the expander unit, the flywheel being slidable in an axial direction along the shaft over a distance at least the length of the counterbore to be machined in the pipe, the flywheel being simultaneously slidable and rotatable on the shaft;

(d) a frame including a tool mount, the frame being simultaneously circumferentially affixed and radially movably attached to the flywheel such that the frame rotates with the flywheel around the shaft but can move in a radial direction relative to the center axis of the flywheel, the tool mount being disposed radially such that the tool mount can travel with the flywheel into the interior of the pipe during counterboring;

(e) a guide wheel mount including a first portion rigidly connected to the frame by a guide wheel arm and a second portion including an eccentric shaft having a first shank defining a first shank axis and being rotatable mounted in a bore formed in the first portion of the guide wheel mount and a second shank defining a second shank axis and adapted for rotatably mounting a guide wheel thereon, the first and second shank axes being parallel to one another but spaced apart such that rotation of the eccentric shaft about the first shank axis will change the radial position of the second shank axis with respect to the frame, the guide wheel mount being disposed radially outward from the center axis such that the guide wheel mount travels outside of the pipe during counterboring, the guide wheel arm having a radial member that is axially offset to the rear of the tool mount by a distance at least the length of the counterbore to be machined in the pipe;

(f) a locking mechanism for selectively fixing the relative positions of the first and second shank axes, the locking mechanism including a latch member pivotally connected at a pivot point to the first portion of the guide wheel mount and having a pin portion which extends from the pivot point to selectively engage one of a plurality of holes formed around the periphery of the eccentric shaft;

(g) a cutting tool having a radially proximal end adjustably mounted to the tool mount and a radially distal end that extends radially beyond the radially outermost point of the frame;

(h) a guide wheel rotatably mounted on the second shank of the guide wheel mount, the guide wheel having an axis of rotation parallel to that of the flywheel, the radially innermost point of the guide wheel being radially outwardly spaced apart from the radially distal end of the cutting tool to define the wall thickness of the counterbore to be machined into the pipe;

(i) an inward force applying member having a first end connected to the frame and a second end connected to the flywheel such that the frame can be radially inwardly moved and biased with respect to the flywheel; and (j) an outward force applying member having a first end connected to the frame and a second end connected to the flywheel such that the frame can be radially outwardly moved and biased with respect to the flywheel.

2. The apparatus of claim 1, wherein the frame is simultaneously circumferentially affixed and radially movably attached to the flywheel by guide structures mounted on the flywheel and guide channels on the frame which interfit such that the frame is linearly slidable in a radial direction relative to the center axis of the flywheel.

3. The apparatus of claim 1, wherein the inward force applying member is a tension spring.

4. An apparatus for machining a counterbore in a pipe, the pipe having an inside surface, a longitudinal axis, an end face with a radial thickness, and an outside surface, the apparatus comprising:

(a) a flywheel adapted for simultaneous rotational movement about, and axial movement along, a center axis coaxial with the longitudinal axis of the pipe;

(b) a frame being attached to the flywheel such that the frame is circumferentially affixed to rotate with the flywheel around the center axis but is capable of movement in a radial direction relative to the center axis, the frame including a tool mount being disposed radially such that the tool mount can travel into the interior of the pipe during counterboring;

(c) a cutting tool having a radially proximal end adjustably mounted to the tool mount and a radially distal end that extends radially beyond the radially outermost point of the frame;

(d) a guide wheel mount including a first portion rigidly connected to the frame by a guide wheel arm and a second portion including an eccentric shaft having a first shank defining a first shank axis and being rotatably mounted in a bore formed in the first portion of the guide wheel mount and a second shank defining a second shank axis adapted for rotatably mounting a guide wheel thereon, the first and second shank axes being parallel to one another but spaced apart such that rotation of the eccentric shaft about the first shank axis will change the radial position of the second shank axis with respect to the frame, the guide wheel mount being disposed radially outward from the center axis such that the guide wheel mount travels outside of the pipe during counterboring;

(e) an external adjusting mechanism for selectively changing the relative radial positions of the first and second shank axes of the eccentric shaft, the external adjusting mechanism remaining radially outward of the pipe during counterboring and including a plurality of holes formed around the periphery of the eccentric shaft, the holes being adapted to receive therein a portion of a tool for rotating the eccentric shaft;

(f) a locking mechanism for selectively fixing the relative radial positions of the first and second shank axes of the eccentric shaft;

(g) a guide wheel rotatably mounted on the second shank of the guide wheel mount, the guide wheel having an axis of rotation parallel to that of the flywheel, the radially innermost point of the guide wheel being radially outwardly spaced apart from the radially distal end of the cutting tool to define the wall thickness of the counterbore to be machined into the pipe; and (h) an inward force applying member having a first end connected to the frame and a second end connected to the flywheel such that the frame can be radially inwardly moved and biased with respect to the flywheel.

5. The apparatus of claim 4, wherein the locking mechanism further comprises a latch member pivotally connected at a pivot point to the first portion of the guide wheel mount and having a pin portion which extends from the pivot point to selectively engage one of the plurality of holes formed around the periphery of the eccentric shaft.

6. The apparatus of claim 4, wherein the locking mechanism further comprises an adjustable set screw extending through the first portion of the guide wheel mount into the bore in a direction generally perpendicular to the first shank axis and selectively engaging the first shank of the eccentric shaft.

7. The apparatus of claim 4, wherein the inward force applying member is a tension spring.

8. A method of counterboring a pipe having an inside surface, a longitudinal axis, an end face with a radial thickness, and an outside surface, the method comprising the steps of:

(a) providing a counterbore apparatus including a flywheel adapted for simultaneous rotational movement about, and axial movement along, a center axis coaxial with the longitudinal axis of the pipe, a frame attached to the flywheel so as to rotate with the flywheel around the center axis but being capable of movement in a radial direction relative to the center axis, a cutting tool having a radially proximal end adjustably mounted to the frame and a radially distal end that extends radially beyond the radially outermost point of the frame, a guide wheel mount including a first portion rigidly connected to the frame by a guide wheel arm and a second portion including an eccentric shaft having a first shank defining a first shank axis and being rotatably mounted in a bore formed in the first portion of the guide wheel mount and a second shank defining a second shank axis adapted for rotatably mounting a guide wheel thereon, the first and second shank axes being parallel to one another but spaced apart such that rotation of the eccentric shaft about the first shank axis will change the radial position of the second shank axis with respect to the frame, the guide wheel mount being disposed radially outward from the center axis such that the guide wheel mount travels outside of the pipe during counterboring, an external adjusting mechanism for selectively changing the relative radial positions of the first and second shank axes, the external adjusting mechanism remaining radially outside of the pipe during counterboring and including a plurality of holes formed around the periphery of the eccentric shaft, the holes being adapted to receive therein a portion of a tool for rotating the eccentric shaft, a locking mechanism for selectively fixing the relative positions of the first and second shank axes, a guide wheel rotatably mounted on the second shank of the guide wheel mount, the guide wheel having an axis of rotation parallel to that of the flywheel, the radially innermost point of the guide wheel being radially outwardly spaced apart from the radially distal end of the cutting tool to define the wall thickness of the counterbore to be machined into the pipe and an inward force applying member having a first end connected to the frame and a second end connected to the flywheel such that the frame can be radially inwardly moved and biased with respect to the flywheel;

(b) setting the desired radial wall thickness for the counterbore by adjusting the radial distance between the radially innermost point of the guide wheel and the radially outermost point of the cutting tool;

(c) advancing the flywheel axially along the center axis until the cutting tool is adjacent the end face of the pipe and a portion of the guide wheel is axially aligned with the outside surface of the pipe;

(d) using the inward force applying member to maintain a radially inwardly directed bias on the frame with respect to the flywheel to hold the guide wheel against the outer surface of the pipe;

(e) rotating the flywheel about the center axis and axially advancing the flywheel along the center axis a predetermined distance to force the cutting tool against the end face of the pipe such that the cutting tool travels into the interior of the pipe and machines a counterbore;

(f) releasing, after the cutting tool has machined a counterbore and while the cutting tool is in the interior of the pipe, the locking mechanism to allow rotation of the eccentric shaft;

(g) inserting, while the cutting tool remains in the interior of the pipe, a tool into one of the plurality of holes of the external adjusting mechanism;

(h) rotating, while the cutting tool remains in the interior of the pipe, the eccentric shaft using the tool inserted in the hole of the external adjusting mechanism to change the radial position of the guide wheel with respect to the frame to increase the radial distance between the radially innermost point on the guide wheel and the radially outermost point on the cutting tool, thereby allowing the cutting tool to move radially inward and out of contact with the inner surface of the counterbore due to the continuing inward bias being maintained by the inward force applying member;

(i) withdrawing the flywheel axially along the center axis until the cutting tool is outside of the pipe.

9. The method of claim 8, wherein the step of releasing the locking mechanism further comprises: operating a latch member pivotally connected at a pivot point to the first portion of the guide wheel mount and having a pin portion which extends from the pivot point to selectively engage one of the plurality of holes formed around the periphery of the eccentric shaft to withdraw the pin portion from engagement with any of the plurality of holes.

10. The method of claim 8, wherein the step of releasing the locking mechanism further comprises: operating an adjustable set screw extending through the first portion of the guide wheel mount into the bore in a direction generally perpendicular to the first shank axis and selectively engaging the first shank of the eccentric shaft to disengage the set screw from the first shank.

* * * * *